United States Patent
Fish et al.

(10) Patent No.: US 7,819,749 B1
(45) Date of Patent: Oct. 26, 2010

(54) USING A PARTICIPANT LIST TO INVITE PLAYERS TO AN ON-LINE GAME

(75) Inventors: Edmund J. Fish, Great Falls, VA (US); Allen J. Eichler, Waterford, VA (US); June R. Herold, Falls Church, VA (US)

(73) Assignee: AOL Inc., Dulles, VA (US)

( * ) Notice: Subject to any disclaimer, the term of this patent is extended or adjusted under 35 U.S.C. 154(b) by 1167 days.

(21) Appl. No.: 11/017,203

(22) Filed: Dec. 21, 2004

(51) Int. Cl.
A63F 9/00 (2006.01)
(52) U.S. Cl. .................................................. 463/42
(58) Field of Classification Search .............. 463/1, 463/25, 42
See application file for complete search history.

(56) References Cited

U.S. PATENT DOCUMENTS

| | | | |
|---|---|---|---|
| 5,971,854 A | 10/1999 | Pearson | |
| 6,559,194 B2 | 5/2003 | Malwitz | |
| 6,676,521 B1 | 1/2004 | La Mura | |
| 6,699,125 B2 | 3/2004 | Kirmse | |
| 6,908,389 B1* | 6/2005 | Puskala | 463/40 |
| 6,993,555 B2 | 1/2006 | Kay et al. | |
| 7,043,530 B2 | 5/2006 | Isaacs et al. | |
| 7,158,798 B2* | 1/2007 | Lee et al. | 455/456.3 |
| 7,168,089 B2 | 1/2007 | Nguyen et al. | |
| 7,194,004 B1 | 3/2007 | Thomsen | |
| 7,222,171 B2 | 5/2007 | Fukumoto et al. | |
| 7,240,093 B1* | 7/2007 | Danieli et al. | 709/205 |
| 7,313,760 B2 | 12/2007 | Grossman et al. | |
| 2002/0086732 A1* | 7/2002 | Kirmse et al. | 463/42 |
| 2003/0125112 A1* | 7/2003 | Silvester | 463/42 |
| 2003/0182420 A1 | 9/2003 | Jones et al. | |
| 2003/0190960 A1 | 10/2003 | Jokipii | |
| 2004/0152517 A1 | 8/2004 | Hardisty et al. | |
| 2004/0198403 A1* | 10/2004 | Pedersen et al. | 455/517 |
| 2004/0224769 A1* | 11/2004 | Hansen et al. | 463/40 |
| 2004/0224771 A1 | 11/2004 | Chen et al. | |
| 2004/0224772 A1* | 11/2004 | Canessa et al. | 463/42 |
| 2006/0031785 A1 | 2/2006 | Raciborski | |
| 2006/0100006 A1 | 5/2006 | Mitchell et al. | |

OTHER PUBLICATIONS

Yahoo Backgammon. Jun. 18, 2006. <http://web.archive.org/web/20060618071747/http://www.gammoned.com/yahoo-backgammon.html>.*

OldYank's Unofficial Guide to Yahoo! Bridge. Dec. 2, 2002. <http://web.archive.org/web/20021206081528/http://www.geocities.com/oldyank1/yahoo.html>.*

(Continued)

*Primary Examiner*—Peter DungBa Vo
*Assistant Examiner*—Seng Heng Lim
(74) *Attorney, Agent, or Firm*—Finnegan, Henderson, Farabow, Garrett & Dunner, LLP

(57) ABSTRACT

An instant messaging user may use a buddy list that includes a user-selected list of potential instant messaging recipients ("buddies") to identify another instant messaging user with whom instant messages are to be exchanged. An instant messaging user also may use a buddy list for other purposes, such as to initiate playing of an on-line game or to invite participants to play an on-line game. The buddy list may be used as an on-line game leaderboard that presents a list of players of the on-line game in ranked order.

21 Claims, 10 Drawing Sheets

OTHER PUBLICATIONS

Playing Internet Pool. Aug. 10, 2004. <http://web.archive.org/web/20040810213026/internetgames.about.com/library/weekly/aa012703a.htm>.*

GameSpy Arcade—Play Hundreds of Online Multiplayer Games!, Viewing Your PlayerSpy List, http://www.gamespyarcade.com/support/help/communicate.shtml, pp. 1-3, Mar. 26, 2004.

GameSpy Arcade—Play Hundreds of Online Multiplayer Games!, Where You're At, http://www.gamespyarcade.com/support/help/youarehere.shtml, pp. 1-2, Mar. 26, 2004.

GameSpy Arcade—Play Hundreds of Online Multiplayer Games!, GameSpy Arcade's User Rooms, http://www.gamespyarcade.com/support/help/userrooms.shtml, pp. 1-2, Mar. 26, 2004.

Roger Wilco Base Station, http://rogerwilco.gamespy.com/products/rwbs/index.html, pp. 1-2, Mar. 26, 2004.

Roger Wilco Product Information, http://rogerwilco.gamespy.com/products/rw/index.html, pp. 1-2, Mar. 26, 2004.

GameSpy Arcade—Play Hundreds of Online Multiplayer Games!, Unique Nicknames in GameSpy Arcade, http://www.gamespyarcade.com/support/nicknames.shtml, pp. 1-2, Mar. 26, 2004.

Pixel Technologies, Cross-Platform Game Technology description, Pixel Technologies—ITV, Mobile and PC Entertainment & Edutainment Channels, http://www.pixel-tech.com/itvtechnology.html, pp. 1-2, Mar. 26, 2004.

Sega Sports, NFL 2K3 Video Game description, http://www.football-gaming.com/sega/nfl2k3/manual/xbox/xbox-25.html, pp. 1-2, Mar. 26, 2004.

Pixel Technologies, Cross-Platform Game Technology description, Pixel Technologies—ITV, Mobile and PC Entertainment & Edutainment Channels, http://www.pixel-tech.com/mobileonline.html, p. 1, Mar. 26, 2004.

GameSpy Arcade—Play Hundreds of Online Multiplayer Games!, Inviting people to Play a Game, http://www.gamespyarcade.com/support/help/player_match.shtml, pp. 1-2, Mar. 26, 2004.

GameSpy Arcade—Play Hundreds of Online Multiplayer Games!, Arcade Support Central, http://www.gamespyarcade.com/support/, pp. 1-2, Mar. 26, 2004.

GameSpy Arcade—Play Hundreds of Online Multiplayer Games!, Sending Files to Another User, http://www.gamespyarcade.com/support/help/file_transfer.shtml, pp. 1-2, Mar. 26, 2004.

GameSpy Arcade—Play Hundreds of Online Multiplayer Games!, Using Arcade's Client Side Filtering, http://www.gamespyarcade.com/support/filter.shtml, pp. 1-3, Mar. 26, 2004.

Non-final Office Action dated Sep. 17, 2007 (U.S. Appl. No. 11/016,879).

Roger Wilco Product Informaiton, http://roderwilcogamespy.com/products/rw/index.html, pp. 1-2, Mar. 26, 2004.

* cited by examiner

USING A PARTICIPANT LIST TO INVITE PLAYERS TO AN ON-LINE GAME

TECHNICAL FIELD

This description relates to inviting participants to join a gaming application accessible to networked computers.

BACKGROUND

On-line services may provide users with the ability to send and receive instant messages. Instant messages may be exchanged in a private on-line conversation between two or more people who have access to an instant messaging service and who have installed communications software necessary to access and use the instant messaging service. A participant list that includes the communications identities with which a user exchanges instant messages may be displayed for a user.

A game application may be accessible thorough a network of computers and may be referred to as an on-line game. Players may be invited to participate in an on-line game. Players scores, particularly the highest player scores, may be displayed for an on-line game in a ranked list referred to as a leaderboard.

SUMMARY

In one general aspect, a participant is invited to play a session of an on-line game. A participant list is displayed for the on-line game where the participant list includes a subset of less than all potential participants of the on-line game, is associated with game results information for the subset of the less than all potential participants as related to the on-line game, and displays a ranking of potential participants from the subset of less than all potential participants of the on-line game based on the game results information. An indication of a potential participant of an on-line game accessible over a network of computers is received where the potential participant is one of the potential participants displayed on the participant list. An invitation to the potential participant to play the session of the on-line game is generated. Transmission of the invitation to the potential, participant is enabled.

Implementations may include one or more of the following features. For example, an indication of more than one potential participant of the on-line game accessible over a network of computers may be received. Transmission of invitations to the more than one potential participant to play the session of the on-line game may be enabled. One of the potential participants may be a potential participant that is not included in the participant list, and one of one potential participants may be a potential participant that is included in the participant list.

Game results information associated with the participant list may be only updated if the session of the on-line game is designated as counting toward the ranking of the potential participants. Enabling transmission of the invitation may include enabling transmission of an invitation to a particular potential participant when presence information associated with the potential participant reflects that the particular potential participant is on-line or only when presence only when presence information associated with the particular potential participant reflects that the particular potential participant is on-line.

Enabling transmission of the invitation may include enabling transmission of an invitation to a particular potential participant when presence information associated with the particular potential participant reflects that the particular potential participant is off-line. Enabling transmission of the invitation may include storing the invitation when the particular potential participant is off-line, and transmitting the invitation to the particular potential participant when presence information associated with the particular potential participant reflects that the particular potential participant is on-line. Enabling transmission of the invitation comprises may include transmission of invitation to the particular potential participant using an electronic mail system.

The invitation may include a game parameter that describes a game option to be used when playing the session of the on-line game. The display of the invitation and the game parameter may be enabled. A conditional acceptance of the invitation to play the session of the on-line game also may be enabled. The conditional acceptance may include an alternative game parameter, and rejection or acceptance of the alternative game parameter may be enabled.

The participant list may be associated with a duration. Game results information for the potential participants associated with the particular list may be accumulated only for sessions of the on-line game that occur during the duration. The duration may be a period of time or a number of sessions of the on-line game.

At least some of the one or more potential participants may be geographically dispersed from other of the one or more potential participants, and each potential participant may access the on-line game using a computer connected to the network of computers over which the on-line game is accessible.

The participant list may be or include a leaderboard associated with an instant messaging service. The participant list may be or include a leaderboard operable within the on-line game.

Implementations of the techniques discussed above may include a method or process, a system or apparatus, or computer software on a computer-accessible medium.

The details of one or more of the implementations are set forth in the accompanying drawings and description below. Other features will be apparent from the description and drawings, and from the claims.

DESCRIPTION OF THE DRAWINGS

Like reference symbols in the various drawings indicate like elements.

DETAILED DESCRIPTION

An instant messaging user may use a buddy list that includes a user-selected list of potential instant messaging recipients ("buddies") to identify another instant messaging user with whom instant messages are to be exchanged. An instant messaging user also may use a buddy list for other purposes, such as to initiate playing of an on-line game or to invite participants to play an on-line game.

An on-line game leaderboard may present a ranked list of the highest scoring game participants ("players"). The leaders displayed on a leaderboard may be selected from among all of the players who have played the particular game. Alternatively or additionally, a game leaderboard may rank the relative game scores of a subset of affiliated players. As such, the leaderboard may be referred to as a buddy leaderboard. For example, a leaderboard may rank all of the players who are identified as buddies on a particular player's buddy list or a subset of the players who are identified as buddies on a particular player's buddy list. A leaderboard also may rank players who are of a similar skill level for the on-line game to which the leaderboard applies. A player may enjoy the ability to learn who is the highest scoring player from among the player's acquaintances or the ability to determine where the player ranks relative the player's acquaintances. This may be particularly true when the game is played by many geographically-dispersed individuals, most of whom may not be acquainted with one another. Techniques are provided to invite a potential participant to play an on-line game by identifying the potential participant using a leaderboard for the on-line game to which the potential participant ("invitee") is invited.

In one exemplary implementation, a buddy list is a user-definable list of other co-users (i.e., buddies) of an on-line or network communications systems that enables the user to perceive presence information and changes for the co-users in a graphical user interface (GUI) and to track changes to presence status for the co-users in substantially real-time automatically, where presence indicates the status of the co-user with respect to the on-line or network communications system. The buddy list also provides the user with a mechanism to initiate communications (e.g., instant messages (IMs), electronic mail (e-mail), chat, and other communications) with the co-users. A buddy list may include one or more on-line game groups that associate buddies who are potential participants of a particular type of game or may include a general gaming group that associates buddies who are interested in on-line gaming.

Figure 1:
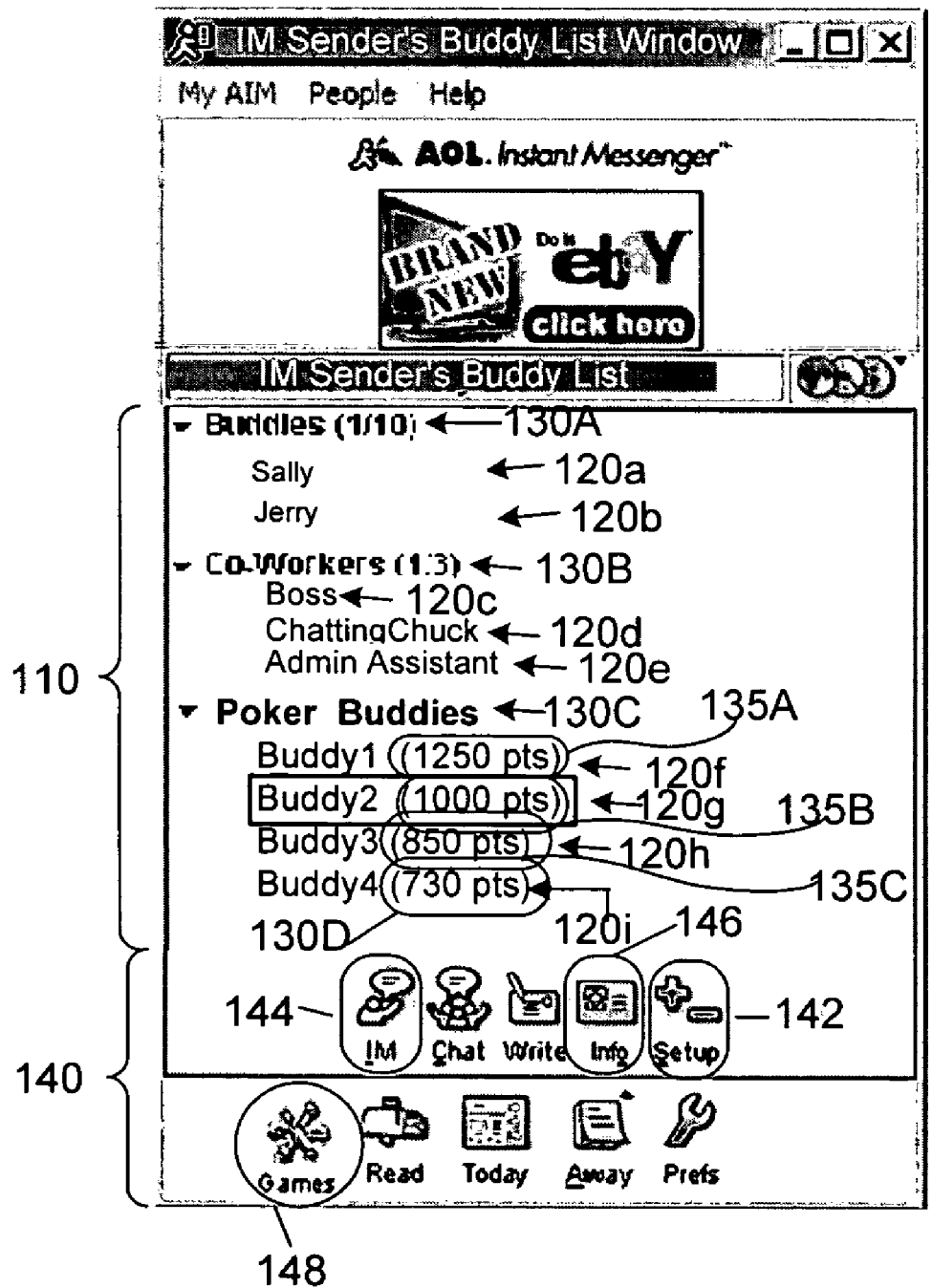
FIGS. 1-5 are diagrams of exemplary user interfaces for an instant messaging service capable of sending an invitation to a potential participant from a leaderboard for an on-line game.

FIG. 1 illustrates an exemplary graphical user interface 100 for an instant messaging service capable of enabling an invitation to a potential participant from a buddy leaderboard that associates a subset of potential participants from the set of all potential participants. Typically, the buddy leaderboard associates a number of potential participants who are affiliated or known to the potential instant message sender (e.g., the potential participants are friends, work together, have a mutual friend, are acquainted with one another through on-line gaming, or are of a similar skill level in an on-line game), though this need not necessarily be so. For example, a buddy leaderboard may associate randomly selected potential participants, such as may occur in an on-line game tournament or when a potential participant volunteers to join any on-going game of a particular game type and/or skill level.

The graphical user interface 100 includes a list 110 of potential instant messaging recipients ("buddies") 120a-120i. The potential instant message recipients also may be referred to as communication participants, communication identities, instant message users, friends or contacts. For convenience, the term "buddies" is used in this description and, as such, the graphical user interface 100 may be referred to as an instant message buddy list window 100 or, more simply, a buddy list window 100, and the list 110 may be referred to as a buddy list 110. A buddy is identified by a screen name or other type of identity identifier, such as an account name, a user name, or a mobile telephone number. In particular, the user IMSender is an instant message sender using the user interface 100. The user interface (UI) 100 is rendered on a display of a computing device or a communication device on which an instant message client program is executed.

In the buddy list 110, the representations 120a-120i include text identifying the screen names of the buddies included in buddy list 110; however, additional or alternative information may be used to represent one or more of the buddies, such as an avatar or other type of graphical image that is associated with the buddy. The avatar or other image may be reduced in size and either still or animated. For example, the representation 120c includes the screen name of the instant message recipient named Boss. For convenience, each of the representations 120a-120i may be referred to as a screen name 120a-120i. In some implementations, one or more of the representations 120a-120i may be an alias of a screen name rather than a screen name itself. The representations 120a-120i may provide connectivity information to the instant message sender about the buddy, such as whether the buddy is on-line, how long the buddy has been on-line, whether the buddy is away from the computing device or communication device and remains signed-on to the instant message service, or whether the buddy is available through a mobile device.

Buddies may be grouped by an instant message sender into one or more user-defined or pre-selected groupings ("groups"). As shown, the instant message buddy list window 100 has three groups, Buddies 130A, Co-Workers 130B, and Poker Buddies 130C. Sally 120a belongs to the Buddies group 130A, and ChattingChuck 120d belongs to the Co-Workers group 130B. When a buddy's instant message client program is able to receive communications, the buddy is said to be on-line and the representation of the buddy in the buddy list is displayed under the name or representation of the buddy group to which the buddy belongs. As shown, all of the potential instant messaging recipients 120a-120i are on-line. In contrast, when a buddy's instant message client program is not able to receive communications (e.g., a buddy is not signed-on to the instant message service), the representation of the buddy in the buddy list may not be displayed under the group with which it is associated, and instead, may be displayed with representations of buddies from other groups under the heading Offline (not shown).

The Poker Buddies group 130C of the buddy list 110 includes buddies 120f-120i that are potential participants of an on-line game (here, an on-line poker game). The Poker Buddies group 130C may be referred to as a game buddy group because the list of buddies are organized in relation to a particular on-line game. The buddy list 110 also may be referred to as a game buddy list 110. The screen names for buddies may be added to the Poker Buddies group 130C in a conventional manner (e.g., a buddy is configured as a member of the group 130C by the owner of the buddy list and represents a person with some sort of affiliation with the owner of the buddy list), and, as such, represents a permanent member of the group 130C.

In addition, screen names for the buddies of the game group 130C may be added by the instant messaging system after the owner of the buddy list plays a game with the buddy. A buddy added to a game group in such a manner may be associated with the buddy list for a limited period of time and may be referred to as a temporary game buddy. For example, a buddy list may permit a predetermined number of temporary game buddies to be displayed on the buddy list, and a temporary buddy may be displaced by other more recent temporary game buddies (e.g., temporary game buddies "roll-off" the buddy list on a first-in, first-out basis as additional temporary game buddies are added to the buddy list). As such, the gaming group 130C may be used to help track game relationships that naturally occur in the course of gaming. Including temporary game buddies on the buddy list may be useful to allow a user to invite a user (who is identified as temporary game buddy on a buddy list) subsequently to play a game other than the first game that resulted in the temporary game buddy being added to the buddy list, particularly in a gaming context in which people join games without first having a personal acquaintance.

Each of the buddies 120f-120i in the game group 130C also includes parenthetical information 135A-135D that indicates the accumulated game score each of the buddies 120f-120i. The buddies 120f-120i in the game group 130C are presented based on the relative ranking of the accumulated game scores 135A-135D. In particular, the game buddy 120f is presented first because the game buddy 120f has the highest accumulated game score or ranking 135A (here, 1250 points) of the accumulated game scores or ranking 135A-135D of the game buddies 120f-120i listed in the game group 130C. Similarly, the game buddy 120g is presented second because the game buddy 120g has the second highest accumulated game score or ranking 135B (here, 1000 points), and game buddy 120h is listed third and has the third highest accumulated game score or ranking 135C (here, 850 points). The game buddy 120g may not necessarily be the overall game leader (e.g., highest scoring player) across all game participants because, for example, there may be game participants that have higher accumulated game scores that do not appear in the game group 130C. The ranking of buddies in the game group 130C is a relative ranking of the buddies that are associated with the game group 130C. As such, the game group 130C also may be referred to as a buddy leaderboard for the particular game (here, poker).

In other implementations, the score or ranking displayed for a buddy may be relative to the score or ranking of the buddy list owner. For example, if IMSender had a ranking of 900 points, the rankings displayed for buddies 120f-120i would be, respectively, 350, 100, −50 and −170. In yet other implementations, the score for the buddy list owner may be displayed, or the buddy list owner may be included in the list.

The buddy list window 100 also includes controls 140 that a user may use to initiate functions. In particular, a setup control 142 allows for configuration of the currently displayed buddy list. Selecting the setup control 142 enables the addition and deletion of screen names, such as screen names 120a and 120b, and groups, such as groups 130A and 130B, to the buddy list 110. After selecting a screen name 120b from the buddy list 110, selecting an IM control 144 displays an interface for communicating with the account corresponding to the selected screen name. Selecting the IM control 144 without selecting an on-line screen name in the buddy list 110 displays an interface for communicating and allows a user to identify an instant messaging user that is not on the user's buddy list. An info control 146 displays information related to a screen name selected on the buddy list 110 when information is available about the selected buddy. Such information may include, for example, name, geographic location, interests and hobbies, and occupation of the buddy. In some implementations, a user may configure whether such information is displayed to other users.

The buddy list window 100 also includes a games control 148 to initiate an on-line gaming application. In particular, the games control 148 initiates display of a game interface from which one of multiple on-line games may be selected and which may be used to invite a buddy to participate in an on-line game, as described more fully with respect to FIG. 2.

In some implementations, a buddy leaderboard that tracks individual scores may be used to track the scores that different players attain in a single-player game. As such, in some respects, the buddy leaderboard makes a single-player game into a multi-player game by allowing cross-game competition between players where the player scores attained by individual players are accumulated in the buddy leaderboard.

Figure 2:
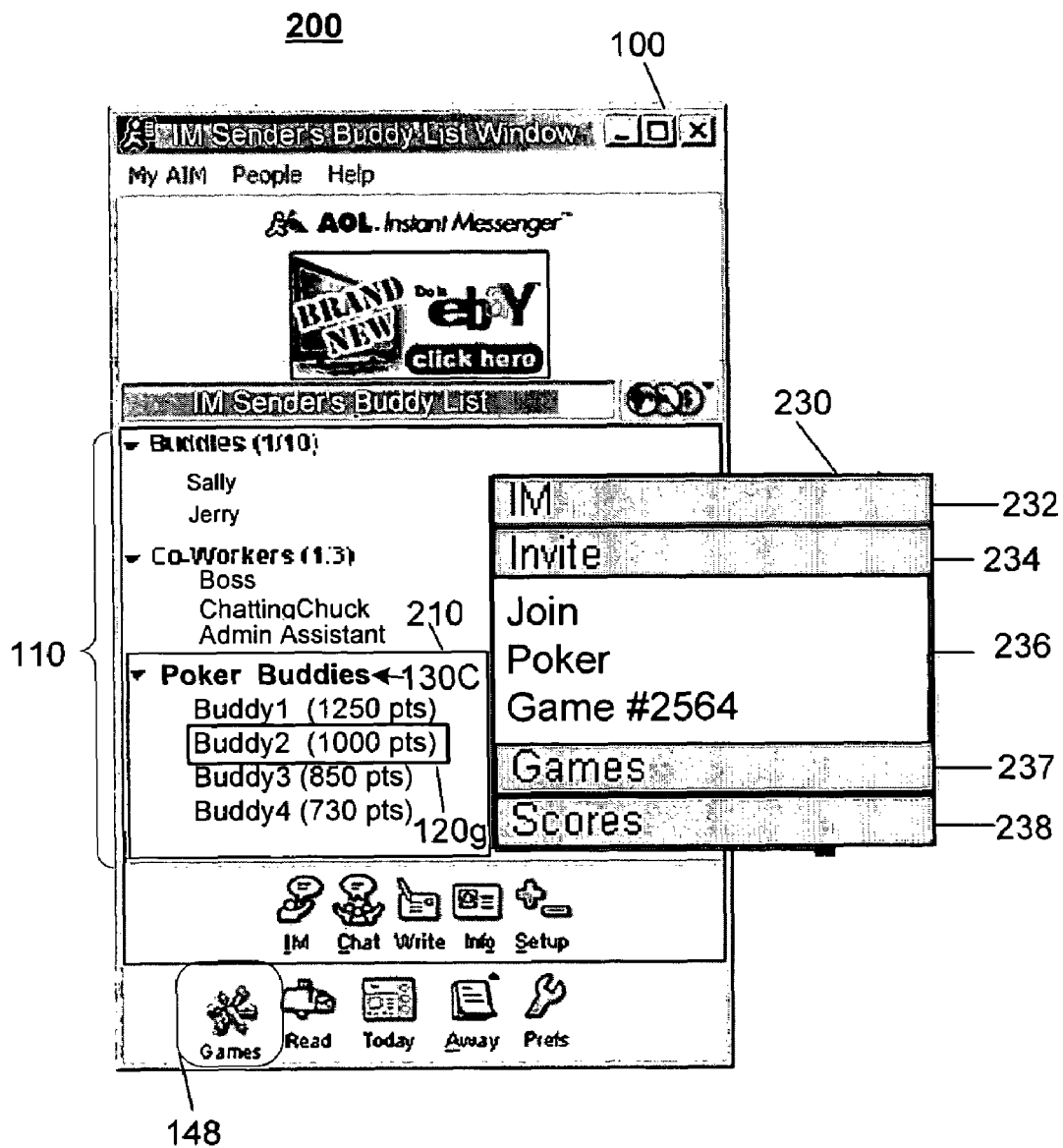

FIG. 2 illustrates an example user interface 200 that includes a buddy list 110 having a buddy leaderboard 210 operable to invite potential game participants. More particularly, the user interface 200 includes a buddy list 110 that includes the game group 130C of the buddy list 110 of FIG. 1 and a game menu 230. The game group 130C displays the relative ranking of the buddies based on accumulated points in an on-line poker game application. As such, the game group 130C also may be referred to as a buddy leaderboard 210. The user interface 200 is operable to display the game menu 230, for example, in response to the activation of games control 148 by a user or when a game buddy is selected from the leaderboard 210. As illustrated here, the game buddy 120g is selected from the leaderboard.

The game menu 230 includes multiple selection options 232-238. A selection option 232 is operable to send a general purpose instant message to a buddy selected from the leaderboard. A selection option 234 is operable to invite the selected buddy 120g to play the game identified by game group 130c on the leaderboard (here, poker). A selection option 236 enables the owner of the buddy list 110 to join a particular game in progress. As illustrated, the selection option 236 enables the user IM sender to join poker game number 22564. A selection option 237 displays a list of games to which the user may invite the selected buddy and/or may join, and a selection option 238 displays scores for all buddies for various games. In some implementations, the scores selection option 238 may enable a user to display only scores for the selected buddy or the buddies identified in the game group 130C.

Figure 3:
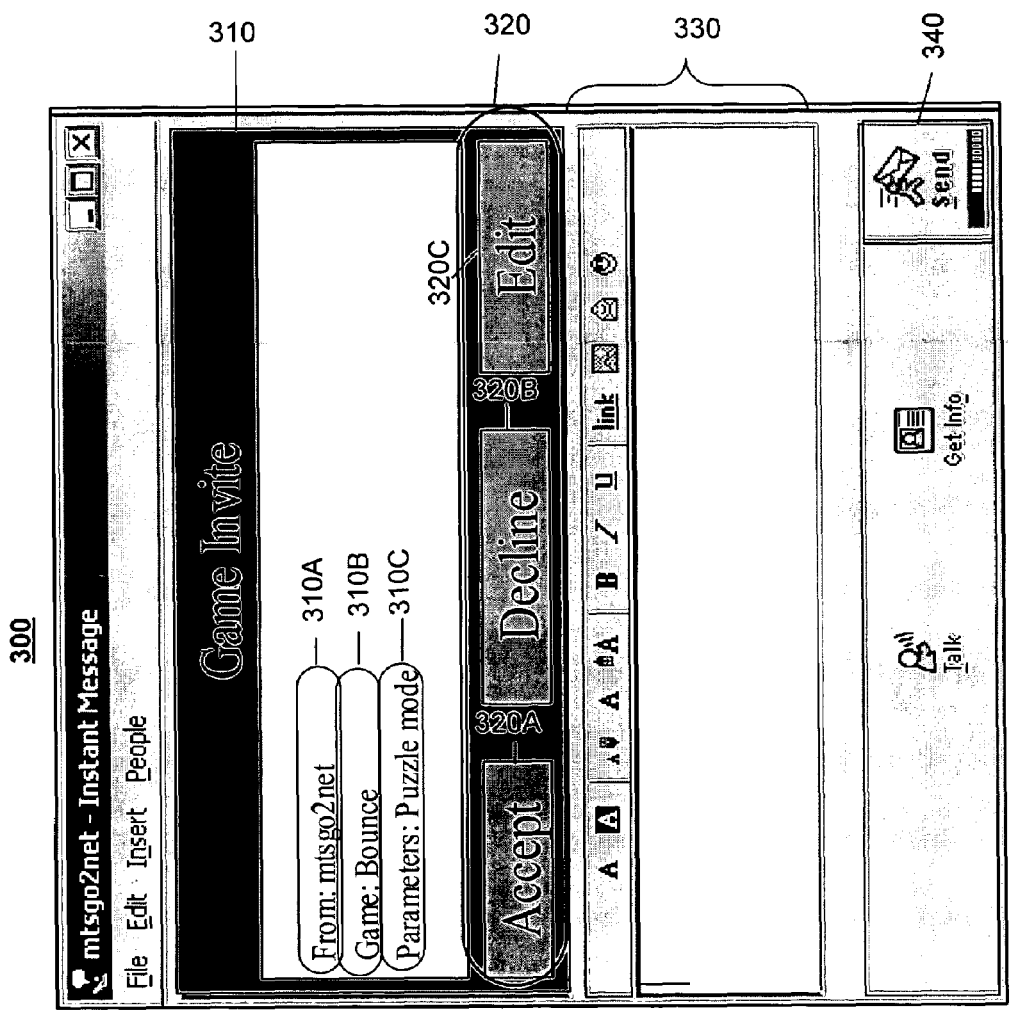

FIG. 3 illustrates a game invitation window 300 that may be displayed to invite a user to play an on-line game. For example, the game invitation window 300 may be displayed on a display device used by an invited participant in response to the activation of the invite selection option 234 of FIG. 2. The game invitation window 300 also may be displayed in response to the selection of a buddy 120f-120h from the game group 130C of FIG. 1.

The game invitation window 300 includes an invitation information portion 310. The invitation information portion 310 identifies the user 310A (i.e., "mtsgo2net") issuing the invitation, the game 310B (i.e., "Bounce") to which the user is being invited, and game parameters 310C (i.e., "Puzzle mode") that govern the game identified in 310B. The ability to provide configuration information about game parameters with an invitation allows, for example, an invitee to make an informed decision about whether to participate based on the configuration parameters of the game. In one example, a buddy may be invited to play a particular flavor or type of a game, such as a particular type of poker, and decide whether or not to accept the game invitation based on the type of poker to be played. This may obviate the need to replace a player who initially accepted the invitation to play poker without knowing the type of poker to be played and later drops out of the game after finding out the type of poker to be played.

The game invitation window 300 also include controls 320. An accept control 320A is operable to indicate the invitee's acceptance of the invitation (e.g., willingness to play the game). The accept control 320A also may launch the game application associated with the identified game 310B or otherwise enable the invitee to begin playing the game.

A decline control 320B is operable to send an IM or another type of communication to the game initiator or organizer (e.g., the owner of the buddy list from which the invitation was sent) to inform the game organizer that the invitee is unwilling or unable to play the game. This may be useful to provide notice to the game organizer that the invited player is not going to play.

In some implementations, an edit control 320C is operable to permit a user to change the game parameters 310C. Editing the parameter may result in a decline of the original offer and an invitation to play the game with different parameters, which also may cause the "ownership" of the game (which may influence who is able to invite players to the game and control other aspects of the game) to change from the user who originally issued the invitation to the potential player who conditionally accepted the invitation. A user who is considered the owner of the game also may be referred to as a game organizer. Alternatively, editing the parameters may result in a proposal to modify the game parameters but leave the game ownership unchanged (that is, residing with the original initiator who may choose to have the parameters changed automatically or after prompting). Alternatively or additionally, a user may be able to configure whether editing game parameters causes a change in game ownership change on a transient or persistent basis.

The game invitation window 300 also, through the exchange of instant messages, enables negotiation of game parameters during the invitation process. More particularly, as illustrated here, the send control 340 allows a user, who is a recipient of the game invitation, to propose alternative or additional game parameters by sending, to the game organizer, a message entered in the response compose window 330 to propose one or more game parameters or conditions under which the invitee is willing to play the game. This enables the negotiation of game parameters between the game organizer and the invitee before the game begins. For example, an invitee to participate in a football game may conditionally accept the invitation by indicating that the invitee is only willing to play under certain game conditions. An example exchange of instant messages between the invitee and the game organizer follows:

Invitee: Yes, I'll play if I can be the blue team.

Game organizer: The blue team is already taken. How about being the red team?

Invitee: Okay, I'll play if I can be the red team.

Game organizer: Sounds good.

The invitee then may indicate the invitee's willingness to play by selecting the accept control 320A to launch the particular on-line game application.

In some implementations, the game invitation window 300 may be generated by the on-line game application (rather than an instant message service) and enable the invited player to accept 320A the invitation, decline 320B the invitation to provide notice to the game organizer that the invited player is not going to play the game, and/or edit 320C the game parameters.

The game invitation window 300 may be include an embedded link (such as an hypertext mark-up language link (HTML-link)) that is activated to launch the game application on the invitee's computing device or communication device and, thus, enable the invitee to play the game to which the invitee was invited. The game invitation window 300 also may be a form-based dialog box that is able to launch the game application on the invitee's computing device or communication device through the selection of a type of control other than a link.

Figure 4:
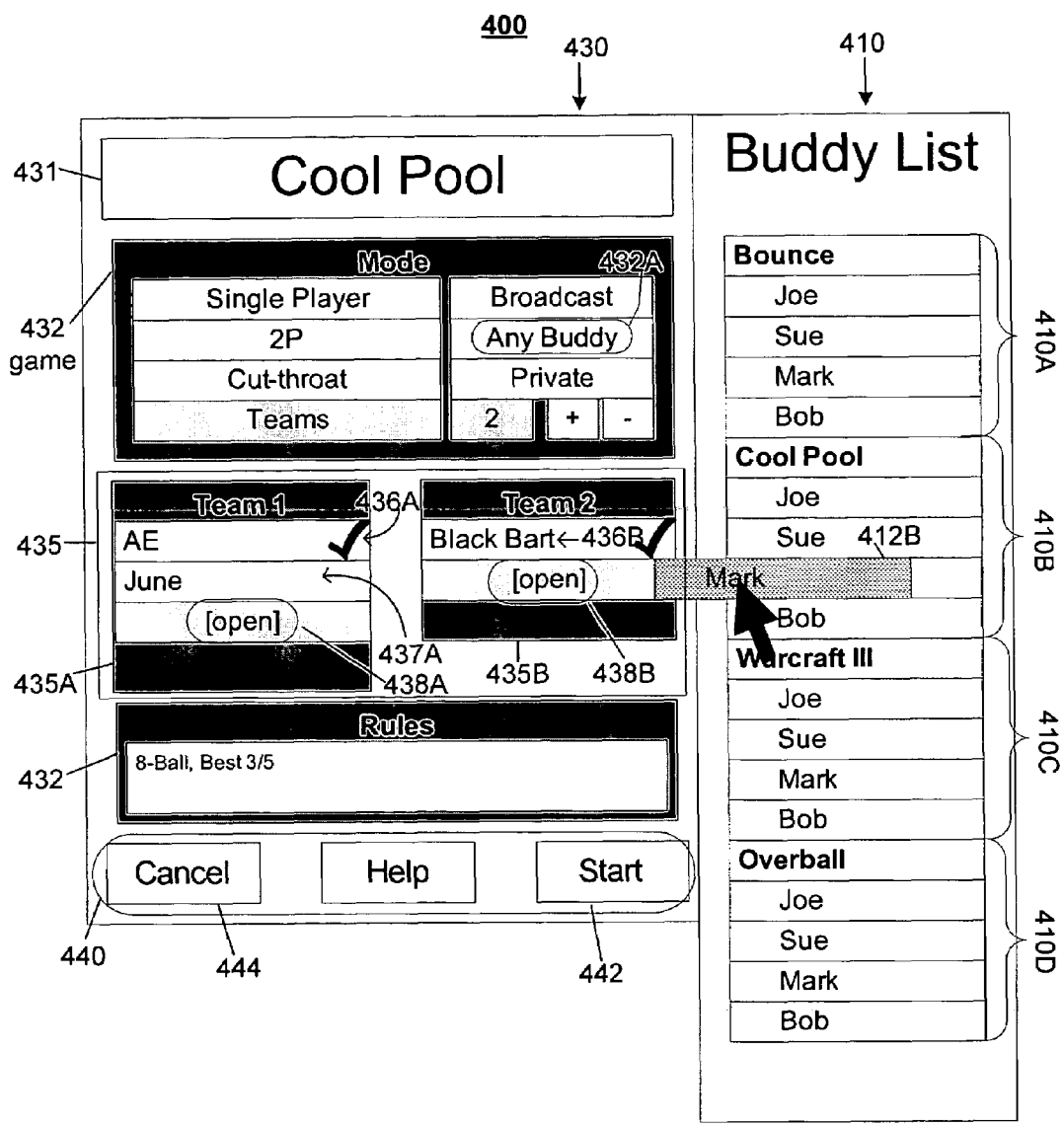

FIG. 4 illustrates another example user interface 400 that includes a buddy list 410 operable to invite potential participants to an on-line game. In contrast with the user interface 200 of FIG. 2 and the user interface 300 of FIG. 3, the user interface 400 is integrated into the game application itself. The user interface 400 includes a leaderboard 410 that includes multiple leaderboards 410A, 410B, 410C and 410D, each of which is applicable to a different game. In one example, leaderboard 410B represents the buddies for the game "Cool Pool" in order of each buddy's accumulated score. As shown and in contrast to the buddy leaderboard 110 presented in FIGS. 1-3, each of the leaderboards 410A, 410B, 410C and 410D ranks the buddies based on a buddy's accumulated score and does not display each buddy's accumulated score.

The user interface 400 also includes game information window 430 for the "Cool Pool" game 431. The game information window 410 allows a user of the interface 400 to invite a buddy and manage the invitation process for a game of "Cool Pool." The game information window 430 also includes game parameters 432 describing the mode of play as well as the rules by which the game is to be played. For example, the game parameter 432A allows buddies other than buddies appearing on the leaderboard 410B to be invited to play in the game, as indicated by the "Any Buddy" game parameter 432A. In some implementations, the "Any Buddy" game parameter 432A may still require an invitee to appear on a buddy list of one of the other invited potential participants. An invitation in such a case may be referred to as "a friend of a friend" invitation. This enables, for example, an invitee to the game to invite the invitee's own buddy (who is not a buddy of the game originator) to participate in the game. In some implementations, the "Any Buddy" game parameter 432A does not necessarily limit invitations only to potential participants that appear on the game organizer's buddy list or a buddy list of an invitee. For example, the "Any Buddy" game parameter 432A may indicate a broadcast invitation sent to multiple potential participants that may not necessarily appear on a buddy list. This may be particularly useful for a game that requires a large number of game participants.

The game invitation information window 430 also includes information 435 as to participant assignments to one of multiple teams for the game. As illustrated, the team information 435 includes indications of potential participants who have been invited, who have accepted, and any open slots for which invitations may be sent. More particularly, a first team 435A includes up to three participants, and a second team 435B includes up to two participants. Invitations to two of the participant slots 436A and 437A have been sent, and one open slot 438A remains for which an invitation may be sent. The team information window 435 indicates that the invited participant 436A has accepted the invitation, as shown by check mark associated with the invited participant 436A. In contrast, the invited participant 437A has not yet accepted, as shown by the lack of a check mark associated with invited participant 437A. Similarly, team information 435B for the second team indicates that the invited participant 436B has accepted, and there is an open slot 438B for which an invitation may be sent. Thus, the user interface 400 helps in keeping track of which invitees have accepted. This may be particularly useful when individual invitations are sent to invited potential participants.

The user interface 400 is operable to allow a user to drag-and-drop a buddy from the cool pool buddy leaderboard 410B into any open slot listed in game team information 435. As illustrated, the buddy 412B is dragged onto the open slot 439B of the information 435B for the second team, which causes an invitation to be sent to the buddy 412B, as described previously.

The game information window 430 also includes controls 440, including a cancel control 444 that allows a user to cancel the invitation issued to one of the users who have not yet responded. For example, the invitation to invited buddy 438A of the first team may be canceled to enable invitations to be sent to two potential participants for the open slot 439A and the newly-opened slot resulting from the cancellation of slot 438A of team information 435A for the first team. In some implementations, an invitation may be automatically cancelled without further user manipulation after a predetermined amount of time has passed since the invitation was sent. The predetermined amount of time may be user-configurable.

A start control 442 is operable to launch the Cool Pool game application for the players who have accepted invitations, with the players being assigned to the teams as indicated in team information 435.

Figure 5:
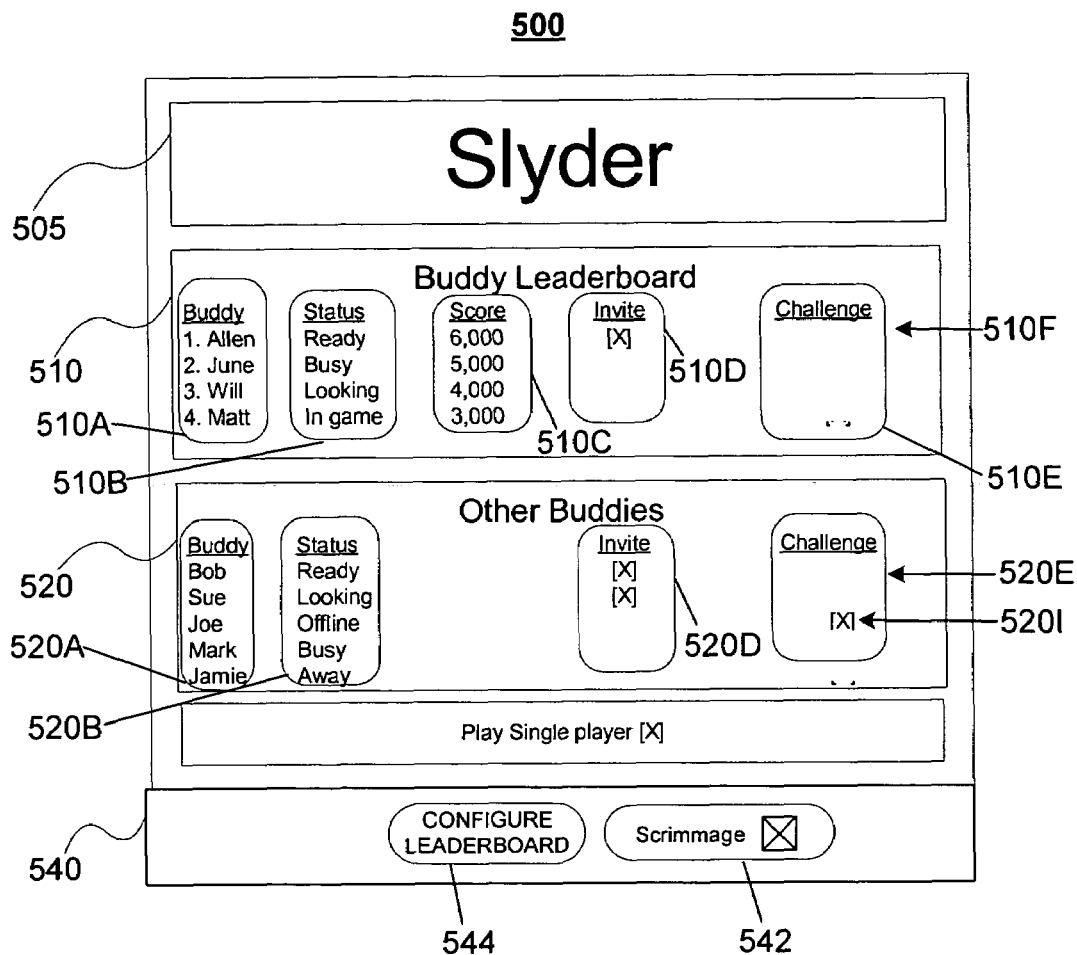

FIG. 5 shows a user interface 500 that illustrates yet another example user interface that represents an integrated buddy leaderboard and player selector for a particular game. The user interface 500 may be implemented as a user interface of an instant message service or as part of a game application.

The user interface 500 includes a game identifier 505, buddy leaderboard 510 that identifies the highest scoring buddies, and a game buddy list 520 that identifies buddies other than the buddies listed in the leaderboard 510. Both the leaderboard 510 and the game buddy list 520 are associated with a particular on-line game 505. The buddy leaderboard 510 and the game buddy list 520 may be useful to allow a user to identify and invite for a game both one or more of the high scoring players from the user's buddies and one or more other buddies who are not high scoring players and, as a result, don't appear on the buddy leaderboard 510.

The buddy leaderboard 510 includes, for each buddy, a screen name 510A, a status 510B related to whether the buddy is available to play a game, and a score 510C. The buddy status 510B indicates the readiness of the corresponding buddy to play the identified game 505. Examples of a status include that a buddy is ready to play a game (i.e., "Ready"), that the buddy is busy and is unable to play a game (i.e., "Busy"), and that the buddy is seeking to play a game (i.e., "Looking"). Other examples of a status may include that the buddy is in a game currently (i.e., "In game"), is not on-line (i.e., "Offline"), or is away from the computing device or communication device (i.e., "Away"). The buddies presented in buddy leaderboard 510 are presented in ranked order based on the score 510C corresponding to each buddy.

The buddy leaderboard 510 also includes controls for inviting a buddy to play the game identified in game identifier 505. In one mode (which may be referred to as an "invite" mode), an invitation is sent to a buddy whose on-line presence is recognized by the invitation service, (e.g., the instant message service or the game application). For example, if a buddy is signed-on to the instant message service, a user is able to send an on-line invitation to the buddy using an invite control 510D that corresponds to the screen name of the buddy to be invited. The invitation is sent to the buddy in order to ask the buddy to join a game at the time the invitation is sent or shortly thereafter (e.g., when the buddy responds to the invitation).

In another mode, a challenge is sent to a buddy when a control 510E that corresponds to the buddy is selected. The challenge control 510*e* enables a user to challenge a buddy to a game at a future time, even if the buddy is not presently signed-on to the invitation system. In some implementations, the challenge may be delivered when the buddy signs-on to the game application or the instant messaging system. In other implementations, the challenge may be delivered to the buddy through other mechanisms, such as an electronic mail system or a SMS ("short message service") text message. Additionally or alternatively, some implementations also may provide a capability for players to schedule a time to play the game in the future.

The game buddy list 520 lists other buddies of the buddy list owner that are associated with the game identified by the game identifier 505. The game buddy list 520 includes, for each buddy, a screen name 520A and a status 520B indicating the corresponding buddy's availability to play a game. In some implementations, the game buddy list 520 also may include a score for each buddy and/or may rank each buddy based on the buddy's relative score. The game buddy list 520 also includes an invite control 520D and a challenge control 520E to invite or challenge, respectively, a corresponding buddy in the game buddy list.

As illustrated in FIG. 5, a buddy 510F from the buddy leaderboard 510 and two buddies 520B and 520H from the game buddy list 520 are to be invited to the game, and an offline challenge is to be sent to the buddy 520I on the game buddy list 520.

The user interface 500 also includes controls 540. A control 542 enables a user to designate a game to which players from the buddy leaderboard 510 or the game buddy list 520 are being invited or challenged as a scrimmage—that is, the game will not count toward the players' accumulated score in the buddy leaderboard 510 (which, in turn, is reflected in the relative ranking or standing of the players in the buddy leaderboard 510). A player or group of players may enjoy the ability to designate a game as a scrimmage and play a game without concerns about affecting the player's ranking on the buddy leaderboard 510. In some implementations, only some users may be designated as having the ability to designate a game for a particular leaderboard as a scrimmage.

A control 544 enables a user to configure the buddy leaderboard 510. The configure leaderboard control 544 is operable to display a user interface, such as user interface 600 of FIG. 6, that allows a user to configure the buddy leaderboard 510.

Figure 6:
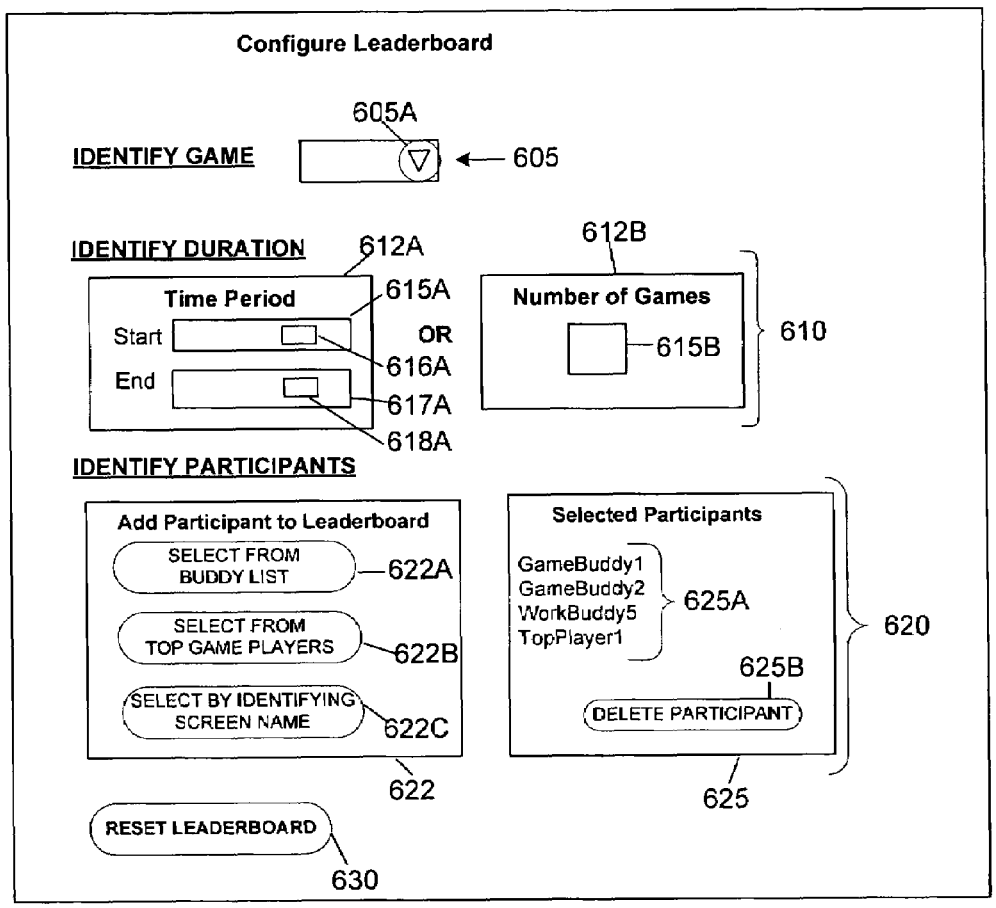
FIG. 6 is a diagram of an exemplary user interface for configuring a leaderboard from which potential participants may be invited.

FIG. 6 illustrates a user interface 600 that is operable to enable a user to create and/or configure a buddy leaderboard from which buddies may be invited to participant in a particular game. The leaderboard configuration window 600 includes a portion 605 to identify a particular game to which the leaderboard applies. A user may identify the game using a control 605*a* that lists all available games for which a leaderboard may be created and subsequently configured.

The leaderboard configuration window 600 also includes a portion 610 to identify a duration for the leaderboard. The duration portion 610 may be identified based on a time period 612A or based on a number of games 612B. The time period 612A enables a user to identify a start date 615A for the time period by optionally using a calendar control 616A to display a calendar by which the start date 615A may be identified.

Similarly, a user may identify an end date 617A and, optionally, may use a calendar function 618A to identify the end date 617A. The time period identified by the start date 615A and the end date 617A defines the time period during which games that are played by buddies associated with the leaderboard count toward the ranking of the buddies on the leaderboard. Alternatively, a user may identify a number of games 615B to be used to define the duration of the leaderboard.

The leaderboard configuration window 600 also includes a portion 620 to identify participants (e.g., buddies) associated with the leaderboard. The participant identification portion 620 includes a window 622 to identify participants to add to the leaderboard 622. Multiple options 622A-622C are presented from which a user may select to add one or more participants to the leaderboard. More particularly, a control 622A is operable to enable the user to select one or more users from the user's buddy list. A control 622B enables a user to select from top players for the game identified in 605A regardless of whether those players are listed on a buddy list associated with the user. In addition, a user may select control 622C to add a participant to the leaderboard by identifying a particular screen name of the participant to be added. For example, a user may be presented with a pop-up field in which the user types a screen name. Regardless of the method used to identify buddies (e.g., whether one or more of the controls 622A, 622B or 622C are used), the screen names of identified participants are presented in selected participant window 625. In particular, the buddies are listed in a selected participant list 625A. The selected participant window 625 also includes a control 625B operable to delete one or more of the participants from the selected participant list 625A.

The leaderboard configuration window 600 also includes a control 630 to force the reset of the leaderboard to which the leaderboard configuration applies. This may be useful when the duration criteria has not been met and all, some or designated participants on the buddy leaderboard agree to reset the scores of the leaderboard and re-start the accumulation of scores on which the ranking of the buddy leaderboard is based. In general, however, the duration information 610 is used to identify when the leaderboard will start and end the accumulation of scores for the buddy associated with the leaderboard.

Before discussing additional detail regarding the method by which a buddy may be invited to play a game from a leaderboard for the game, an example data format that may be used in maintaining a buddy leaderboard is first described.

Figure 7:
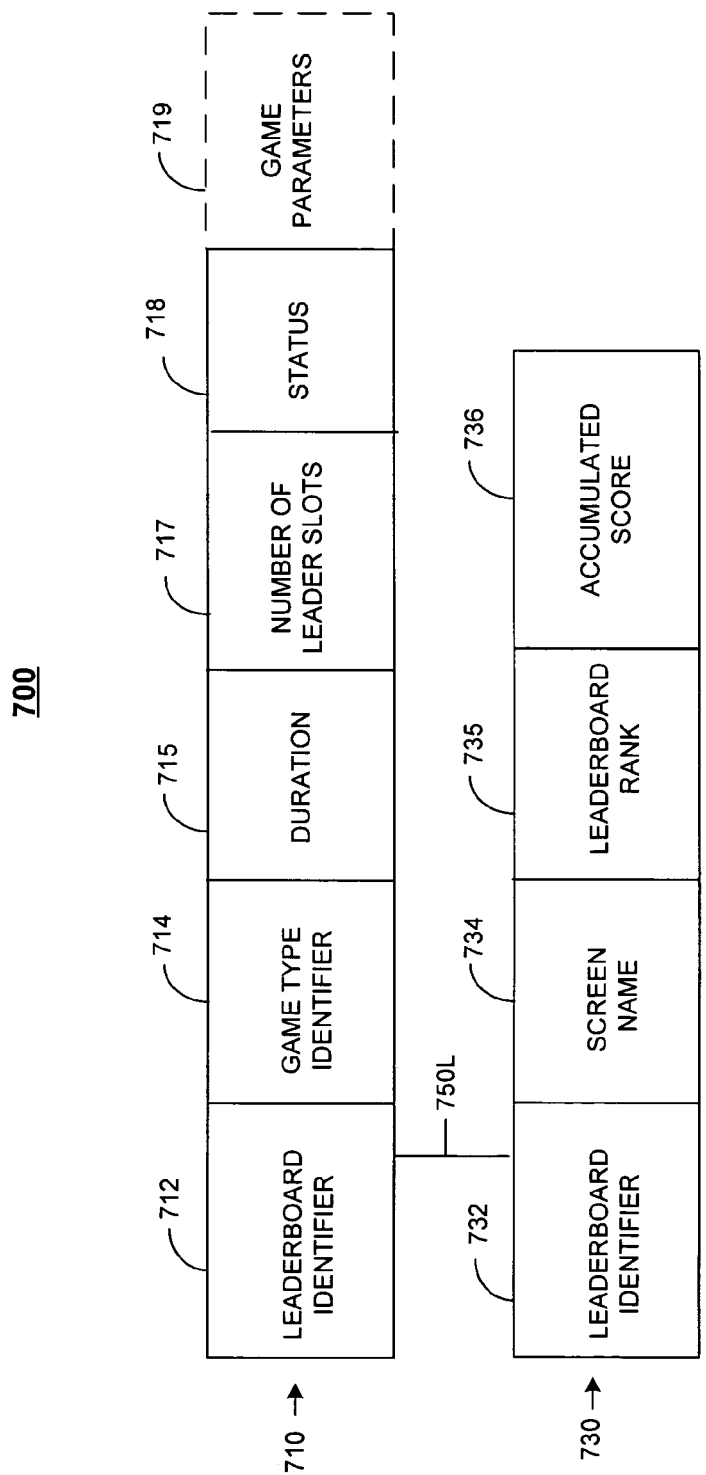
FIG. 7 is a block diagram illustrating a data structure for information related to a leaderboard from which potential participants may be invited.

FIG. 7 shows an example data structure 700 for a buddy leaderboard in simplified form. The data structure 710 includes leaderboard information having a leaderboard identifier 712 to uniquely identify a particularly leaderboard. The leaderboard information 710 also includes a game type identifier 714 that identifies a game to which the leaderboard applies. For example, the game type identifier 714 may identify a game name that was identified in identified game portion 605 of the leaderboard configuration window 600 of FIG. 6. The leaderboard information 710 also includes a duration 715 that identifies duration information that applies to the leaderboard identified by the leaderboard identifier 712. For example, the duration information 715 may identify start and end dates that define a particular period of time during which games that are played by participants associated with the leaderboard are to count toward the accumulated scores of each participant. The duration information 715 also may include a number of games (of the type identified in game type identifier 714) that are to be counted toward the leaderboard scores for the particular leaderboard.

The leaderboard information 710 also includes a number 717 of participant slots to be displayed for the leaderboard. For example, in some implementations, the user may be able to identify the number of leaders (e.g., the highest scoring three, five, or ten participants) that are displayed for the particular leaderboard.

The leaderboard information 710 also includes leaderboard status information 718. In one example, a status 718 may be that the leaderboard is open or active and games played by participants count toward leaderboard scores. Alternatively, a status 718 may indicate that a leaderboard is closed, that is, the duration 715 criteria have been met and scores for the game identified in game type identifier 714 no longer affect the leaderboard status of a user. The use of a status may enable the historical leaderboard information to be saved after the particular duration of a leaderboard has passed.

Optionally, the leaderboard information 710 also may include game parameters 719. In some implementations, a leaderboard may be created and managed for a game having particular game parameters (e.g., a particular type of poker). Thus, an entry of leaderboard information 710 may apply to a type of poker. For example, there may be multiple entries of leaderboard information 710 for poker where each poker entry of leaderboard information 710 applies to a type of poker.

The data structure 700 also includes participant information 730. The participant information 730 includes a leaderboard identifier 732 that uniquely identifies the leaderboard to which the participant is associated. The participant information 730 includes the screen name 734 of a participant associated with the leaderboard corresponding to the leaderboard identified by leaderboard identifier 732. The participant information 730 also includes a leaderboard rank 735 and an accumulated score 736 for the participant identified by the screen name 734.

The leaderboard information 710 and the participant information 730 are related through the use of leaderboard identifiers 712 and 732, respectively, as shown by link 750L. The relationship of leaderboard information 710 to participant information 730 using link 750L may be useful to allow multiple participants to be associated with each leaderboard.

Figure 8:
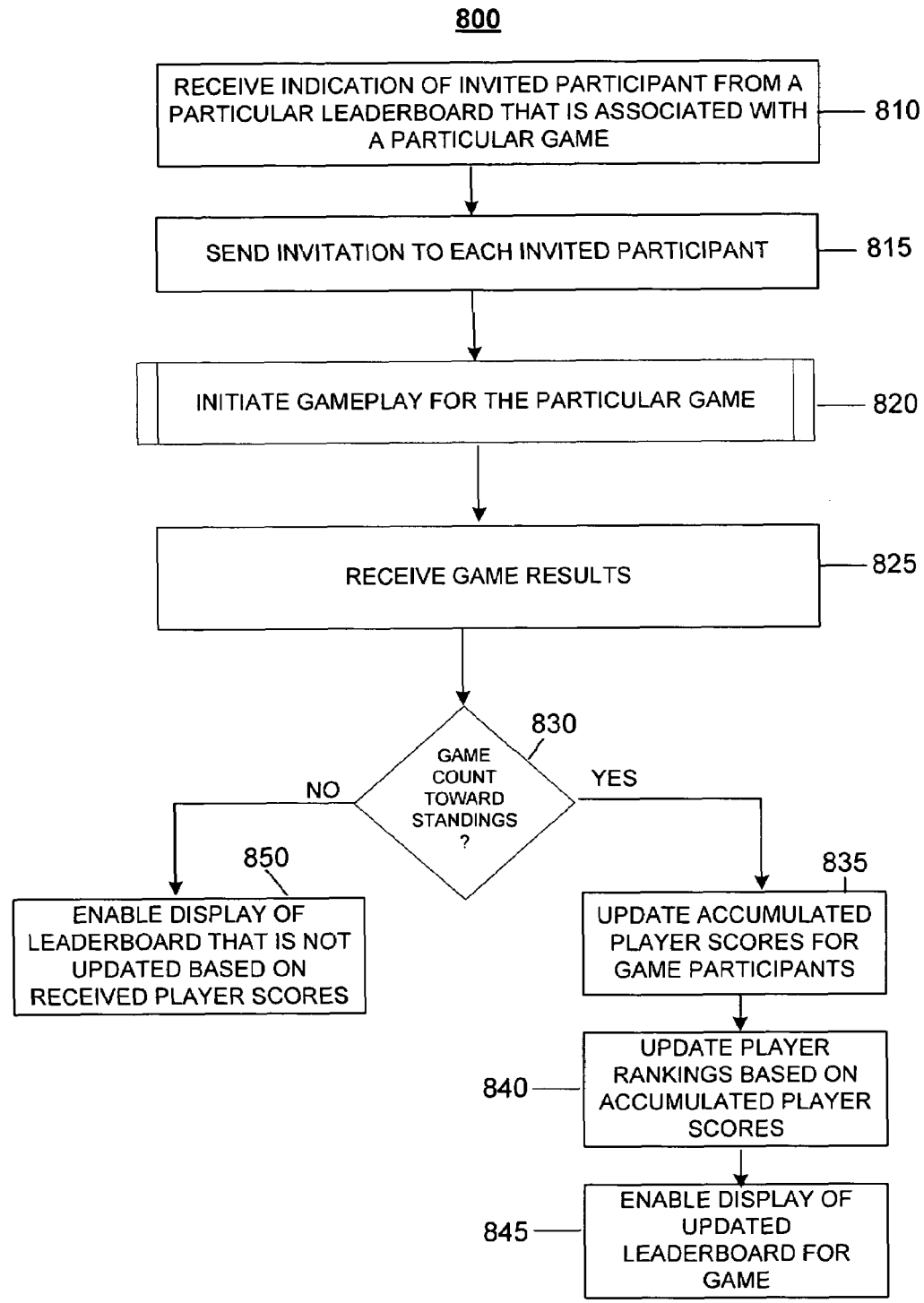
FIG. 8 is a flow chart of a process for inviting a potential player from a leaderboard and updating the leaderboard based on game results.

FIG. 8 depicts a process 800 for inviting a potential participant from a leaderboard and updating the leaderboard based on the results of the game play. The process 800 may be performed, for example, by a processor on an instant messaging provider system, a processor running an instant messaging application, or a processor executing a game application.

The process 800 begins when a user uses a leaderboard for an on-line game to invite potential participants to the on-line game. The processor receives an indication of an invited participant from a particular leaderboard that is associated with a particular game (step 810). This may be accomplished, for example, when the processor receives a screen name from a particular leaderboard and identifies the particular game based on the type of game to which the leaderboard applies.

An invitation is sent by the processor to each invited participant (step 815). When multiple buddies or other types of potential participants are to be invited to play a round of a particular on-line game, invitations to the multiple invited potential participants may be sent. In one example, an individual IM may be sent to each potential recipient, as shown in FIG. 3. In another example, an instant messaging service may be used to send an invitation to a chat session to each potential recipient. The IM chat session may be used to coordinate participation of invited potential participants, setting of game parameters, access to the on-line game, and, if appropriate, sending invitations to other potential participants. In yet another example, an instant messaging sender may use an instant messaging user interface having a command line interface to send invitations to multiple potential participants.

The processor launches the game application to initiate game playing for the particular game (step 820). Subsequently, the processor receives game results (step 825). For example, the processor may receive game results that include scores for each participant. The processor then determines whether the game is to count toward the leaderboard standings (step 830). This may be accomplished, for example, by determining whether the game was designated as a scrimmage in the invitation (e.g., whether a scrimmage indicator, such as the scrimmage indicator 544 of user interface 500, was activated).

When the processor determines the game is to count toward the leaderboard standings (step 830), the processor updates the accumulated score for each game participant (step 835). This may be accomplished, for example, by adding the score for a participant to the leaderboard accumulated score 744 associated with a particular screen name 734 associated with the leaderboard 732, as previously described with the respect to the participant information 730 of FIG. 7. The processor also updates player ranking based on accumulated player scores (step 840). For example, based on the updated accumulated score 736 for each participant associated with the leaderboard, the processor may sort the participant data and rank the participants from the one having the highest accumulated score to the one having the lowest accumulated score. In some implementations, the processor may store the leaderboard rank for each participant in leaderboard rank 735. The processor also enables the display of the updated leaderboard for the game (step 845). This may be accomplished, for example, by pushing to each client application of a buddy associated with the leaderboard, an updated version of the leaderboard information 710 and the participant information 730 for the leaderboard.

When the processor determines that the game is not to count towards the standings (step 830), the processor may enable the display of the leaderboard that is not updated based on received players scores (step 850). Thus, the process 800 enables the users to play games that do not count toward the standings for a particular leaderboard.

In general, only games played with buddies on the leaderboard count toward the accumulated score for a participant. In contrast, some implementations may count scores from a participant associated with the leaderboard toward the participant's leaderboard standings, even when the game is played with a participant that is not associated with the leaderboard.

Figure 9:
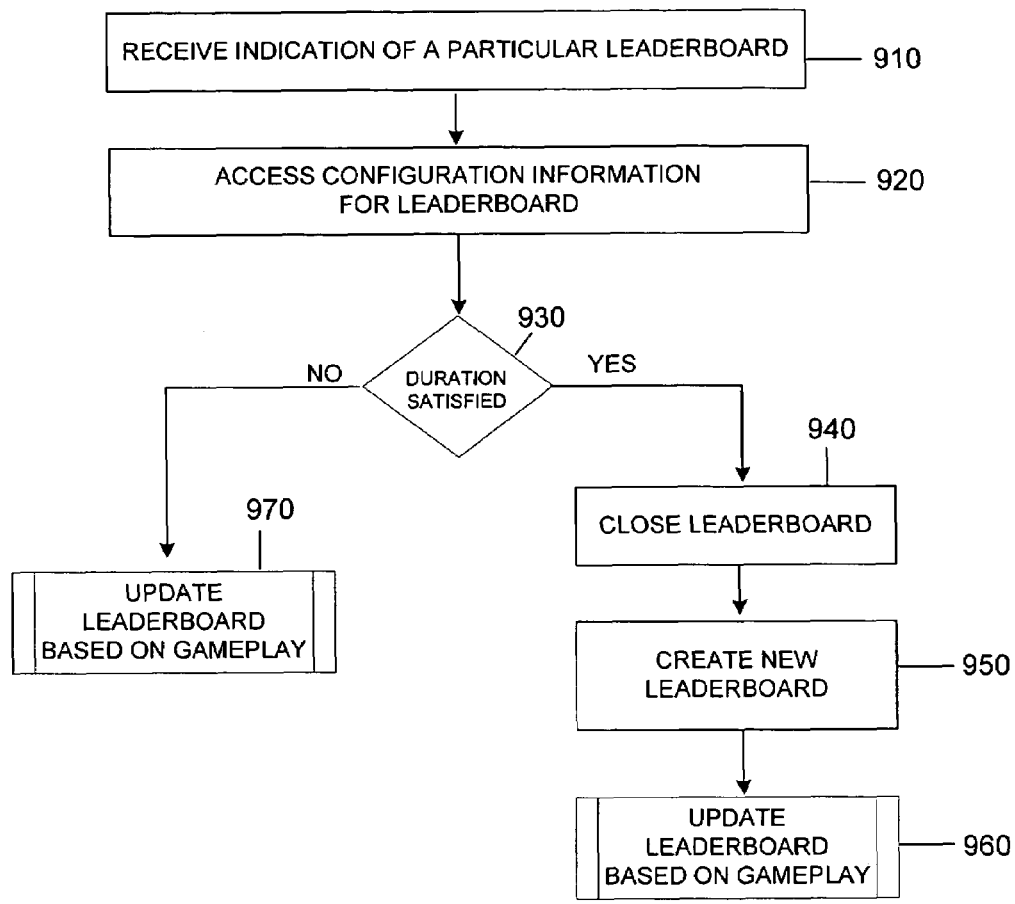
FIG. 9 is a flow chart of a process for determining when a leaderboard should be reset based on configuration parameters associated with the leaderboard.

FIG. 9 depicts a process 900 for determining when a leaderboard should be reset. The process 900 may be performed, for example, by a processor on an instant messaging provider system, a processor running an instant messaging application, or a processor executing a game application.

The process 900 begins when a leaderboard is to be updated based on configuration parameters of the leaderboard. The process 900 receives an indication of a particular leaderboard (step 910) and accesses configuration information for the particular leaderboard (step 920). In one example, the processor may access configuration information 700 that is substantially similar to leaderboard information 710 and participant information 730, as described previously with regard to FIG. 7.

The processor determines whether the duration criteria of the configuration information for the leaderboard has been satisfied (step 930). When the processor determine that the duration criteria is satisfied, the processor closes the existing leaderboard (step 940) and creates a new leaderboard (950). This may be accomplished, for example, by the processor changing the status setting 718 of the existing entry of leaderboard information 710 (corresponding to the leaderboard identified by the leaderboard identifier 712) to "closed." In any event, the processor "closes" the leaderboard information 710 such that the leaderboard information is no longer permitted to be updated based on further game play of the game identified by the game type identifier 714 by the participants identified in participants information 730 for the leaderboard. The processor may create a new leaderboard record (step 950) by creating records for leaderboard information 710 that are associated with the same leaderboard configuration information as the previous leaderboard that was closed in step 940, but that have a revised duration. Participant information 730 for the previous leaderboard also may be copied and created as new participant information entry 730. However, the leaderboard rank 735 and the accumulated score 736 for each participant is deleted or left blank.

The processor then updates the leaderboard based on the game play (step 960). The subprocess to update the leaderboard based on game play may be, for example, an implementation of steps 825 through 850 described previously with respect to FIG. 8. In this example process 900, a leaderboard always includes a leader. Other processes to update a leaderboard may reset the leaderboard (e.g., create a new leaderboard that does not have any rankings or that indicates all players are tied) after posting the game results in the previous version of the leaderboard.

When the processor determines duration criteria for the leaderboard are not satisfied (step 930), the processor updates the leaderboard based on game play (step 970) without creating a new leaderboard or changing the status of the current leaderboard.

Figure 10:
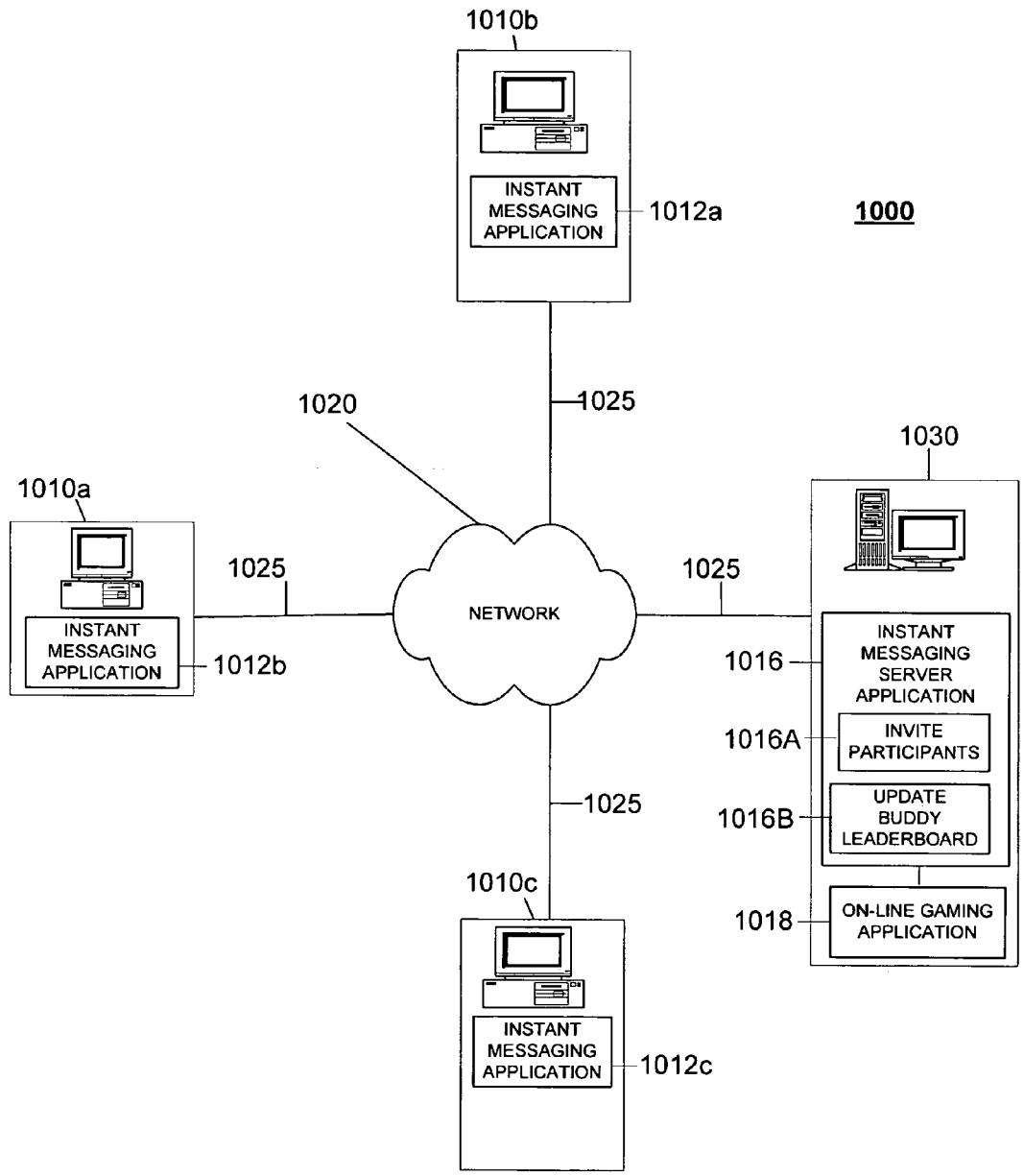
FIG. 10 is a block diagram of a networked computing environment that supports instant messaging and on-line game playing, and which is capable of sending an invitation to a potential participant from a leaderboard.

Referring to FIG. 10, a networked computing environment 1000 supports communications between computer users. The networked computing environment 1000 may be used to send and receive instant messages. Users of the networked computing environment 1000 are distributed geographically and communicate using client systems 1010a-1010c. The client systems 1010a-1010c are shown as including, respectively, IM applications 1012a-1012c. A network 1020 interconnects the client systems 1010a-1010c. The client systems 1010a-1010c are connected to network 1020 through various communication paths 1025, such as a modem connected to a telephone line using, for example, serial line internet protocol (SLIP) or point-to-point protocol (PPP), or a direct network connection using, for example, transmission control protocol/internet protocol (TCP/IP). An instant messaging provider system 1030 also may be connected to the network 1020 and may be used to facilitate some direct or indirect communications between the client systems 1010a-1010c. The provider system 1030 includes an IM server application 1016 and an on-line game application 1018.

Each of the client systems 1010a-1010c and provider system 1030 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 1010a-1010c and the provider system 1030 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 1010a-1010c and the provider system 1030. For instance, such communications programs may include e-mail programs, IM programs, file transfer protocol (FTP) programs, and voice over internet protocol (VoIP) programs. The instructions may be embodied permanently or temporarily in any type of machine, component, equipment, storage medium, or propagated signal that is capable of being delivered to the client systems 1010a-1010c.

Client systems 1010a-1010c and the provider system 1030 include a communications interface (not shown) used by the communications programs to send communications through network 1020. The communications may include e-mail, audio data, video data, general binary data, or text data (e.g., encoded in American Standard Code for Information Interchange (ASCII) format). Client systems also include one or more input devices, such as a keyboard, a mouse, a stylus, or a microphone, as well as one or more output devices, such as a monitor, a touch screen, speakers, or a printer. The network 1020 typically includes a series of portals interconnected through a coherent system. Examples of the network 1020 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line of various types (DSL)), or any other wired or wireless network. The network 1020 may include multiple networks or subnetworks, each of which may include, for example, a wired or wireless data pathway.

The IM applications 1012a-1012c include participant lists that include communications identities ("buddies") with which instant messages are exchanged using the respective client systems 1010a-1010c. More particularly, the IM applications 1012a-1012c include a buddy list for each user that uses the client systems 1010a-1010c to send and receive instant messages. The IM applications 1012a-1012c enable the users to send and receive instant messages with the client systems 1010a-1010c. Instant messages are sent between users of the client systems 1010a-1010c through the IM server application 1016 on the provider system 1030. The IM server application 1016 routes instant messages sent with the IM applications 1012a-1012c.

The provider system 1030 also includes an on-line game application 1018 that supports game sessions to which participants may be invited using a buddy list. The provider system 1030 includes code segments 1016A operable to permit a user to invite buddies listed on a buddy leaderboard to participant in an on-line game supported by the on-line gaming application 1018. The provider system 1030 also includes code segments 1016B operable to update a buddy leaderboard associated with particular buddies and a particular game.

As would be recognized by one of ordinary skill in the art, the networked computing environment 1000 may be structured and arranged differently. For example, the on-line game application 1018 may be operated on a server other than the server on which the instant messaging server application 1016 operates.

Instant messaging programs typically allow instant message senders to communicate in real-time with each other in a variety of ways. For example, many instant messaging programs allow instant message senders to send text as an instant message, to transfer files, and to communicate by voice. Examples of instant messaging communication applications include AIM (America On-line Instant Messenger), AOL (America On-line) Buddy List and Instant Messages which is an aspect of many client communication applications provided by AOL, Yahoo Messenger, MSN Messenger, and ICQ, among others. Although discussed above primarily with respect to instant message applications, other implementations are contemplated for providing similar functionality in platforms and on-line applications. For example, the techniques and concepts may be applied to an animated avatar that acts as an information assistant to convey news; weather, and other information to a user of a computer system or a computing device.

The techniques and concepts generally have been described in the context of an instant messaging system that uses an instant messaging host system to facilitate the instant messaging communication between instant message senders and instant message recipients. Other instant message implementations are contemplated, such as an instant message service in which instant messages are exchanged directly between an instant message sender system and an instant message recipient system.

In addition, although the examples above are given in an instant message context, other communications systems with similar attributes may be used. For example, a participant list may be used in a chat room, in electronic mail (e-mail) communications, and text messaging between voice-enabled devices, such as enabled through Short Message Service (SMS) text messaging. Also, the user interface may be a viewable interface, an audible interface, a tactile interface, or a combination of these.

The techniques and concepts related to a buddy leaderboard have been described in relation to an on-line gaming application. However, the techniques and concepts also may be applicable to an off-line game. For example, a leaderboard for buddies may be created and maintained by entering results from an off-line game (e.g., a poker game that is a traditional card game played with participants in the physical presence of one another and is not an on-line game).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A computer-implemented method for initiating interaction in a session of an on-line game, the method comprising:
    displaying a participant list of on-line potential participants for a general purpose communication interface to a first user, the participant list being associated with the first user of the general purpose communication interface and the on-line game,
    receiving, from the first user, an indication of a potential participant of the on-line game accessible over a network of computers, wherein the potential participant is one of the potential participants displayed on the participant list, and wherein the indication represents user input selecting the potential participant from the participant list, and
    initiating interaction in a session of the on-line game between the first user and the potential participant, wherein initiating interaction within the session of the on-line game comprises:
        enabling transmission of an invitation to the potential participant, the invitation including a game parameter that describes a game option to be used when playing the session of the on-line game,
        enabling display of the invitation and the game parameter to the potential participant,
        enabling conditional acceptance of the invitation to play the session of the on-line game by the potential participant, the conditional acceptance including an alternative game parameter, and
        enabling rejection or acceptance of the alternative game parameter by the first user.

2. The method of claim 1 further comprising:
    receiving an indication of more than one potential participant of the on-line game accessible over a network of computers, and
    wherein initiating comprises enabling transmission of invitations to the more than one participants to play the session of the on-line game.

3. The method of claim 2 wherein at least one of the more than one potential participants is a potential participant that is not included in the participant list.

4. The method of claim 2 wherein at least one of the more than one potential participants is a potential participant that is included in the participant list.

5. The method of claim 1 wherein enabling transmission of the invitation comprises enabling transmission of an invitation to a particular potential participant only when presence information associated with the particular potential participant reflects that the particular potential participant is on-line.

6. The method of claim 1 wherein enabling transmission of the invitation comprises enabling transmission of an invitation to a particular potential participant when presence information associated with the particular potential participant reflects that the particular potential participant is off-line.

7. The method of claim 6 wherein enabling transmission of the invitation comprises:
    storing the invitation when the particular potential participant is off-line, and
    transmitting the invitation to the particular potential participant when presence information associated with the particular potential participant reflects that the particular potential participant is on-line.

8. The method of claim 6 wherein enabling transmission of the invitation comprises enabling transmission of the invitation to the particular potential participant using an electronic mail system.

9. The method of claim 1 wherein the participant list includes at least one potential participant of the on-line game that is associated with historical game information, the method further comprising automatically displaying the at least one potential participant of the on-line game in the participant list.

10. The method of claim 9 wherein the at least one potential participant of the on-line game associated with the historical information is displayed in the participant list for a limited period of time, and wherein the at least one potential participant of the on-line game is automatically removed from the participant list after the limited period of time.

11. The method of claim 9 wherein the limited period of time is related to a number of sessions of the on-line game.

12. The method of claim 9 wherein:
    at least some of the participants are geographically dispersed from others of the potential participants, and
    each potential participant included in the participant list accesses the on-line game using a computer connected to the network of computers over which the on-line game is accessible.

13. The method of claim 1 wherein the participant list comprises a leaderboard associated with an instant messaging service.

14. The method of claim 1 wherein the participant list comprises a leaderboard operable within the on-line game.

15. The method of claim 1 further comprising receiving user input indicating whether the session of the on-line game is to count toward the ranking of the potential participants, wherein:
    initiating comprises generating an invitation that includes a designation of the session of the on-line game as not counting toward the ranking of the potential participants.

16. The method of claim 1, further comprising ranking the potential participants included in the participant list according to information relating to the on-line game.

17. The method of claim 1, further comprising displaying, within the participant list, a status of the potential participants of the on-line game within a system for playing the on-line game.

18. The method of claim 1, wherein initiating comprises providing the first user with a control operable to control a function of a system for playing the online game.

19. The method of claim 18, wherein the control is selected from the group consisting of a game invitation control and a game join control, the game invitation control being operable to invite at least one selected potential participant to a session of the on-line game, and the game join control being operable to join an existing session of the on-line game in which a selected potential participant is currently participating.

20. The method of claim 1, further comprising displaying, in the participant list, information regarding second potential participants included in a second potential participant list associated with one or more of the potential participants of the participant list.

21. The method of claim 1, further comprising displaying, in the participant list, information regarding a readiness to participate in a session of the on-line game of at least one of the potential participants of the participant list.

* * * * *